(12) United States Patent
Chaudhuri et al.

(10) Patent No.: US 7,024,687 B2
(45) Date of Patent: Apr. 4, 2006

(54) SYSTEM AND METHOD FOR PROVIDING END TO END AUTHENTICATION IN A NETWORK ENVIRONMENT

(75) Inventors: Sragdhara D. Chaudhuri, Kolkata (IN); Aseem Sethi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 10/443,980

(22) Filed: May 21, 2003

(65) Prior Publication Data

US 2004/0236947 A1 Nov. 25, 2004

(51) Int. Cl.
*H04L 9/00* (2006.01)

(52) U.S. Cl. .............................. 726/3; 709/229; 370/229

(58) Field of Classification Search ................ 713/200; 709/227, 223–225, 229; 370/389, 338, 401, 370/229–230; 455/410–411; 380/248; 726/2, 726/3
See application file for complete search history.

(56) References Cited

U.S. PATENT DOCUMENTS

| 6,160,808 | A | 12/2000 | Maurya | 370/389 |
| 6,233,232 | B1 | 5/2001 | Chau et al. | 370/352 |
| 6,282,193 | B1 | 8/2001 | Hluchyj et al. | 370/356 |
| 6,445,682 | B1 | 9/2002 | Weitz | 370/257 |
| 6,449,272 | B1 | 9/2002 | Chuah et al. | 370/389 |
| 6,452,920 | B1 * | 9/2002 | Comstock | 370/349 |
| 6,470,453 | B1 | 10/2002 | Vilhuber | 713/201 |
| 6,496,491 | B1 | 12/2002 | Chuah et al. | 370/331 |
| 6,539,482 | B1 | 3/2003 | Blanco et al. | 713/201 |
| 6,654,808 | B1 * | 11/2003 | Chuah | 709/227 |
| 6,687,252 | B1 * | 2/2004 | Bertrand et al. | 370/401 |
| 6,765,881 | B1 * | 7/2004 | Rajakarunanayake | 370/256 |
| 2002/0007412 | A1 * | 1/2002 | Paridaens et al. | 709/229 |
| 2002/0141369 | A1 * | 10/2002 | Perras | 370/338 |
| 2003/0217165 | A1 * | 11/2003 | Buch et al. | 709/229 |

* cited by examiner

*Primary Examiner*—HoSuk Song
*Assistant Examiner*—T. B. Truong
(74) *Attorney, Agent, or Firm*—Baker Botts L.L.P.

(57) ABSTRACT

A method for executing end to end authentication in a network environment is provided that includes initiating a communications tunnel with a layer two tunnel protocol (L2TP) network server (LNS) and communicating an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal. An authentication response may be calculated by using a secret value and a challenge value which is provided by the GGSN, the authentication response being used to establish a communication session associated with the mobile terminal.

24 Claims, 2 Drawing Sheets

U.S. 7,024,687 B2

SYSTEM AND METHOD FOR PROVIDING END TO END AUTHENTICATION IN A NETWORK ENVIRONMENT

TECHNICAL FIELD OF THE INVENTION

This invention relates in general to the field of communications and more particularly to a system and method for providing end to end authentication in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to authenticate an entity via a network, whereby an end user or an object may initiate a tunneling protocol by invoking a selected location or a designated network node. The network node or selected location may then provide a platform that the end user may use to conduct a communication session.

As the subscriber base of end users increases, proper routing, viable security, effective authentication, and efficient management of communication sessions and data flows becomes even more critical. In cases where improper authentication protocols are executed, certain network components may become overwhelmed or network traffic may be susceptible to breaks in security protocols. This scenario may compromise the validity of communication sessions and inhibit the effective flow of network traffic. Accordingly, the ability to provide an effective mechanism to authenticate an end user/mobile terminal, or to offer an appropriate security protocol for a corresponding network provides a significant challenge to network operators, component manufacturers, and system designers.

SUMMARY OF THE INVENTION

From the foregoing, it may be appreciated by those skilled in the art that a need has arisen for an improved communications approach that provides for more appropriate authentication procedures allowing an end to end protocol to be implemented. In accordance with one embodiment of the present invention, a system and method for providing end to end authentication in a network environment are provided that greatly reduce disadvantages and problems associated with conventional authentication techniques.

According to one embodiment of the present invention, there is provided a method for providing end to end authentication in a network environment that includes initiating a communications tunnel with a layer two tunnel protocol (L2TP) network server (LNS) and communicating an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal. An authentication response may be calculated by using a secret value and a challenge value which is provided by the GGSN, the authentication response being used to establish a communication session associated with the mobile terminal.

Certain embodiments of the present invention may provide a number of technical advantages. For example, according to one embodiment of the present invention a communications approach is provided that allows for enhanced security. A security hole may be effectively closed in a corresponding authentication protocol. For example, an authentication challenge may be communicated in a first create response and an authentication response may be delivered in a second create request, whereby such a pair previously was communicated in a single message. Accordingly, even in scenarios where some person or entity intercepts both of these messages and is able to extract the pair (challenge and response), such an entity would not be able to use this data to connect to a corresponding network node (e.g. a layer two tunnel protocol (L2TP) network sever (LNS)). This is due to the fact that the LNS will communicate a different challenge during the next instance of authentication. In order to be properly authenticated, possession of the authentication secret is therefore needed.

Yet another technical advantage associated with one embodiment of the present invention is the result of the operation of the communications approach. The provided architecture allows a multitude of diverse protocols and processes to be implemented in conjunction with an end-to-end scenario. For example, point to point (PPP) regeneration may be operable with any LNS because the necessity for an attribute value pair (AVP) to communicate the challenge in the incoming call connected (ICCN) message is eliminated. Aside from this benefit, the present communications approach further provides for the successful operation of an authentication rechallenge in cases where the PCO field addition to the update context request/response is accepted. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
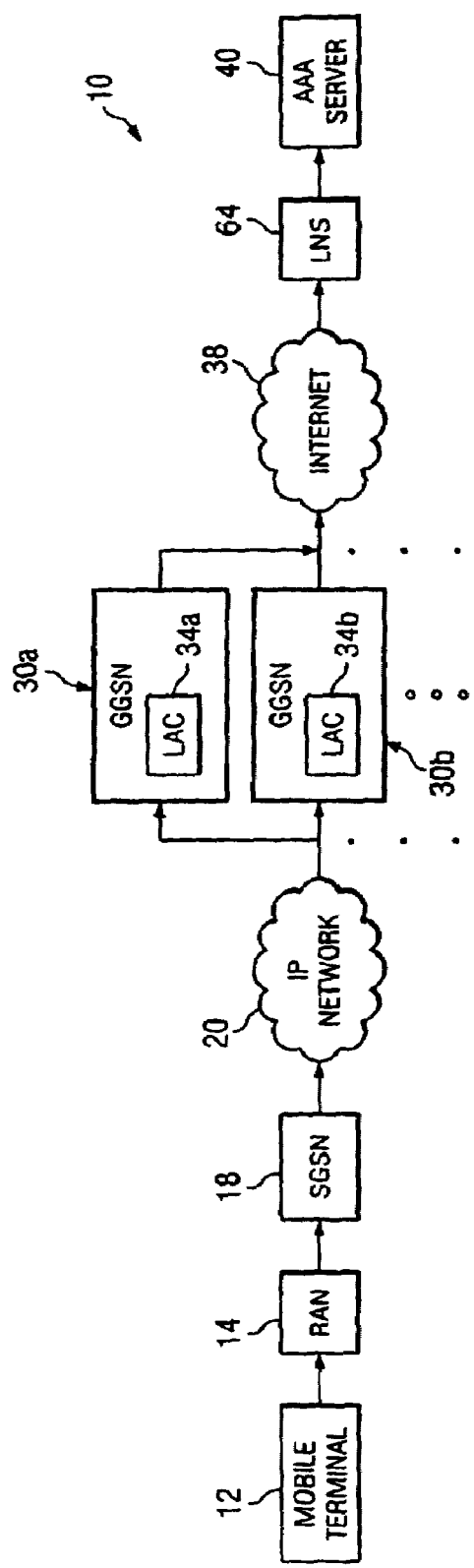
FIG. 1 is a simplified block diagram of a communications system for executing an end to end authentication in a network environment in accordance with one embodiment of the present invention.

FIG. 1 is a simplified block diagram of a communication system 10 for communicating data in a network environment. Communication system 10 includes a mobile terminal 12, a radio access network (RAN) 14, a serving general packet radio service (GPRS) support node (SGSN) 18, and an internet protocol (IP) network 20. Additionally, communication system 10 may include multiple gateway GPRS support nodes (GGSNs) 30*a–b*, multiple layer two tunnel protocol (L2TP) access concentrators (LACs) 34*a–b*, an internet 38, an L2TP network server (LNS) 64, and an authentication, authorization, and accounting (AAA) server 40. FIG. 1 may be generally configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes authentication operations. This may be inclusive of first generation, 2G, and 3G architectures that provide features for executing authentication.

In accordance with the teachings of the present invention, communication system 10 provides a platform in which to execute an end to end point to point (PPP) authentication (e.g. in the context of a challenge handshake authentication protocol (CHAP)). This may be in contrast to other architectures that execute authentication between a LAC element and an LNS element. The authentication mechanism provided by communication system 10 provides a challenge request to be sent from LNS 64 all the way to mobile terminal 12. The challenge value may then be used to calculate the response. The response may then be sent from mobile terminal 12 to LNS 64 in a different message. This allows only the entity holding the secret value associated with the CHAP mechanism to send the response. Thus, even in cases where someone may receive the challenge or the response, authentication may not be executed unless the CHAP secret value is obtained.

For purposes of teaching, it is helpful to provide some overview of the way in which an authentication protocol (e.g. CHAP) functions. This description is offered for purposes of example only and should not be construed in any way to limit the principles and features of the present invention. CHAP may operate to verify the identity of a peer using a three-way handshake. The following general steps may be performed in CHAP: 1) after the link establishment phase is complete, the authenticator may send a challenge message to the peer; 2) the peer may respond with a value calculated using a one-way hash function (potentially over the secret and the challenge); and 3) the authenticator may check the response against its own calculation of the expected hash value. If the values match, the authentication is successful. If the values do not match, the connection may be terminated.

This authentication method relies on a "secret" value known only to the authenticator and the peer. The secret is not necessarily communicated over the link. Although the authentication is only one-way, by negotiating CHAP in both directions, a user may utilize the same secret set for mutual authentication. Additional details relating to the operation of CHAP, as well as its potential application to communication system 10 are provided below.

Mobile terminal 12 represents an end user, a client, or a customer wishing to initiate a communication in communication system 10 via IP network 20. Mobile terminal 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. Mobile terminal 12 may also be inclusive of a suitable interface to the human user, such as a microphone, a display, a keyboard, or other terminal equipment (such as for example an interface to a personal computer or to a facsimile machine in cases where mobile terminal 12 is used as a modem). Mobile terminal 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another. In one embodiment, mobile terminal 12 includes software operable to facilitate the end to end authentication process in accordance with the teachings of the present invention. This software may properly interface with corresponding software provided in a selected GGSN 30*a–b*. Alternatively, mobile terminal 12 may include hardware, algorithms, devices, components, elements, or objects operable to effectuate the end to end authentication operations as described herein.

RAN 14 is a communications interface between mobile terminal 12 and SGSN 18. RAN 14 may also be representative of terminal equipment (TE) (and accordingly these terms may be used interchangeable herein in this document) used to offer a communications platform to one or more mobile terminals 12. RAN 14 may comprise a base transceiver station and a base station controller. The communications interface provided by RAN 14 offers connectivity and allows data to be exchanged between mobile terminal 12 and any number of selected elements within communication system 10. RAN 14 may also facilitate the delivery of a request packet generated by mobile terminal 12 and the reception of information sought by mobile terminal 12. RAN 14 is only one example of a communications interface between mobile terminal 12 and SGSN 18. Other types of communications interfaces may be used for a desired network design and based on particular needs.

SGSN 18 and GGSNs 30*a–b* cooperate in order to facilitate a communication session involving mobile terminal 12. GGSNs 30*a–b* are communications or network nodes that may be working in conjunction with multiple SGSNs 18 to provide a communications medium in a GPRS service network environment in communicating data exchanges within communication system 10. In one embodiment, GGSNs 30*a–b* include software operable to facilitate the end to end authentication process in accordance with the teachings of the present invention. This software may interface with corresponding software provided in mobile terminal 12. Alternatively, mobile terminal 12 may include any suitable hardware, algorithms, devices, components, elements, or objects operable to effectuate the end to end authentication operations as described herein. GGSNs 30*a–b* may also be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

IP network 20 represents a series of points or nodes of interconnected communication paths for receiving and transmitting packets of information that propagate through communication system 10. IP network 20 offers a communicative interface between mobile terminal 12 and selected GGSNs 30*a–b* and may be representative of a GPRS service provider or any suitable local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention; however, IP network 20 may alternatively implement any other suitable communication protocol for transmitting and receiving data or information within communication system 10. In certain scenarios, GTP may be used as a tunneling protocol on top of UDP/IP where appropriate.

LACs 34*a–b* are communication nodes or software modules that act as one side of an L2TP tunnel end point and may be a peer to LNS 64. LACs 34*a–b* may be positioned between LNS 64 and the client and may forward packets to and from each. Packets communicated from LACs 34*a–b* to LNS 64 may require some tunneling with the L2TP protocol. The connection from LACs 34*a–b* to the client may be presented through analog for example. LACs 34*a–b* may be provided external to GGSNs 30*a–b* where appropriate and include any suitable hardware, software, object, element, algorithm, device, or component operable to effectuate the operations thereof.

Internet 38 represents a public internet that offers a communicative interface between GGSNs 30*a–b* and LNS 64 and may be any LAN, WLAN, MAN, WAN, VPN, Intranet or any other appropriate architecture or system that facilitates communications in a network environment. Internet 38 implements a UDP/IP communication language protocol in a particular embodiment of the present invention. However, internet 38 may alternatively implement any other suitable communication protocol for transmitting and receiving data or information within communication system 10. Additionally, internet 38 may interface with any additional element or object in order to facilitate proper end to end authentication in communication system 10. L2TP may be implemented on top of UDP/IP in certain embodiments where appropriate.

AAA server 40 is a server program that receives end user requests for access to networking equipment or resources. 'Networking resources' refers to any device, component, or element that provides some functionality to mobile terminal 12 communicating in communication system 10. AAA server 40 may also provide AAA services and management for a corresponding network. Authorization generally refers to the process of giving mobile terminal 12 permission to do or to access something. In multi-user computer systems, a system administrator may define for the system which end users are allowed access to given locations in the system and, further, what privileges are provided for mobile terminal 12. Once mobile terminal 12 has logged into a network, such as for example IP network 20, the network may wish to identify what resources mobile terminal 12 is given during the communication session. Thus, authorization within communication system 10 may be seen as both a preliminary setting up of permissions by a system administrator and the actual checking or verification of the permission values that have been set up when mobile terminal 12 is attempting access to a selected area. Authentication generally refers to the process of determining whether mobile terminal 12 is in fact who or what it is declared to be. In the case of private or public computer networks, authentication may be done through the use of unique identification elements such as a user identity or log-on passwords. Knowledge of the password offers a presumption that mobile terminal 12 is authentic. Accounting generally refers to financial or session information associated with each mobile terminal 12 or each network and may additionally include trafficking information, session timing information, data transfer statistics, or information relating to other information flows within communication system 10.

AAA server 40 may receive an IP address associated with mobile terminal 12 and other parameters from any suitable network source, or alternatively from a dynamic host configuration protocol (DHCP) server or a domain name system (DNS) database element, in order to direct data to be communicated to mobile terminal 12. AAA server 40 may include any suitable hardware, software, component, or element that operates to receive data associated with mobile terminal 12 and provide corresponding AAA-related functions to network components within communication system 10. Authorization and IP address management may be retrieved from AAA server 40 from LNS 64, which may be provided to address secure services for mobile terminal 12 where appropriate.

In an alternative embodiment of the present invention, communication system 10 may be implemented with any other suitable server (used to supplant AAA server 40) or with any other passive (or incidental) server or element that replaces AAA server 40 and operates as another network element. Additionally, communication system 10 may be configured without AAA server 40 in accordance with the teachings of the present invention. In such an arrangement, other suitable intra-communications between various elements within communication system 10 may be executed in the absence of AAA server 40 in accordance to particular needs.

LNS 64 is a node that operates as one side of an L2TP tunnel end point and is a peer to LACs 34*a–b*. LNS 64 may operate as the logical termination point of a PPP session that is being tunneled from a client (e.g. mobile terminal 12) by LAC 34*a* or LAC 34*b*. A communications tunnel generally exists between an LAC-LNS pair. The tunnel may consist of a control connection and zero or more L2TP sessions. The tunnel may carry encapsulated PPP datagrams and control messages between the LAC and the LNS. The process may be equivalent for a layer two forwarding (L2F) protocol.

In operation of an example CHAP scenario, a GPRS end user communicates data traffic from TE that may be connected to a GPRS handset and be delivered to an Internet and/or corporate networks through GGSNs 30*a–b*. The PPP regeneration feature may be used to regenerate a PPP session for an incoming user IP session at a selected GGSN 30*a–b*, and may establish an L2TP tunnel to deliver these IP packets to its corresponding LNS in encapsulated PPP.

A CHAP authentication procedure not provided with the capabilities of communications system 10 may behave as follows. First, a PPP negotiation takes place between TE and mobile terminal 12. The TE responds to the challenge sent by mobile terminal 12 and mobile terminal 12 responds with a success signal without doing any actual authentication. TE may then send an internet protocol control protocol (IPCP) configure request, and at this point the packet data protocol (PDP) context creation starts. (TE may use the secret value to calculate the response for the challenge that may be sent by mobile terminal 12.) Mobile terminal 12 sends an activate context request to SGSN 18, which is forwarded as create context request by SGSN 18 to GGSN 30*a–b*. Second, the (PCO) field in the create context request received by a selected GGSN 30*a–b* includes the challenge and response. A selected GGSN 30*a–b* may establish an L2TP tunnel to LNS 64 (corresponding to the access point name). This CHAP challenge in the PCO is sent to LNS 64 via an attribute value pairs (AVPs) in L2TP's incoming-call-connected (ICCN) message during the tunnel setup.

Third, PPP negotiation starts between a selected GGSN 30*a–b* and LNS 64. LNS 64 sends that same challenge during the CHAP authentication phase to GGSN 30*a–b*, and GGSN 30*a–b* sends the CHAP response extracted from PCO. Note that is an issue because LNS 64 is just authenticating a selected LAC 34*a–b*, but not mobile terminal 12 itself.

There are numerous problems with such an approach. First, a security hole exists; if anyone were to access or receive any challenge response pair elements that are communicated in the PCO field, such an entity could get connected to LNS 64 without knowing the secret value. Such an entity could theoretically communicate the (challenge, response) pair in the PCO field and pretend to be in possession of the secret. LNS 64 would then be forced by a given GGSN 30*a–b* to send that challenge.

A second problem that may occur in such a process is that a CHAP rechallenge does not work unless a proprietary mechanism is in place with forces LNS 64 to rechallenge with the same secret value. A third problem with such an authentication process is that it is entirely possible that mobile terminal 12/TE may not even be performing PPP that allows these entities to attach to GGSNs 30*a–b*/LNS 64. Instead, these entities may behave as a middle node, and retrieve the above pair, and use that in the regeneration PPP session from GGSNs 30*a–b* to LNS 64. Because PPP is not done between the user and LNS 64 in such a scenario, but only between LACs 34*a–b* and LNS 64, this exposes a significant security hole.

Communication system 10 obviates these problems by providing an architecture that enforces an end to end PPP CHAP, rather than between LACs 34*a–b* and LNS 64. In an example scenario, the PDP context activation may be broken down into two steps. In a first step, mobile terminal 12 sends the activate context request once the link control protocol (LCP) negotiation is done with TE. The PCO field contains the LCP option (including a selected authentication protocol). A selected GGSN 30*a–b* establishes an L2TP tunnel and PPP negotiation starts. When LNS 64 sends the CHAP challenge, a selected GGSN 30*a–b* sends a create context response to SGSN 18 with that challenge in the PCO field. A new cause value can be used in a create context response ("chap in progress").

SGSN 18 will not create the context because the cause value is not "request accepted." It may relay back the create context response as an activate context response to mobile terminal 12. Mobile terminal 12 may extract the challenge from the PCO field in the activate response and send it as CHAP challenge to TE. When TE sends a CHAP response to mobile terminal 12, mobile terminal 12 may send a CHAP-success to TE. TE may then send the IPCP configure request.

In a second step, mobile terminal 12 may send another activate context request, however this time including the CHAP response in the PCO field. A selected GGSN 30*a–b*, in receiving this create context request, may use this response value in the PPP CHAP response to LNS 64. LNS 64 may then certify this response and send back a CHAP-success to a given LAC 34*a–b*, which may just relay it in the PCO field of a create response to SGSN 18. Such an operation effectively achieves an end-to-end CHAP procedure. PPP regeneration may be operable with any suitable LNS 64 and, further, such an implementation effectively closes the security hole described above.

In particular embodiments, in order for a rechallenge to be functional, certain interactions may be appropriate. For example, when LNS 64 rechallenges mobile terminal 12, it may communicate that as part of the L2TP packet to a given GGSN 30*a–b*. The selected GGSN 30*a–b* may forward it to mobile terminal 12. The concept is that this CHAP-challenge value may be communicated in an "update context request" from a selected GGSN 30*a–b* to SGSN 18. It may also be appropriate for a PCO field to be added to provide an "update request" and an "update response" for such an operation. Mobile terminal 12 may extract the challenge from the PCO field and send it to TE. When TE responds, mobile terminal 12 may send a CHAP-success to TE and forward the CHAP-response in the PCO field of an "update context response" to a given GGSN 30*a–b*. The selected GGSN 30*a–b* may communicate the CHAP response to LNS 64. If a selected GGSN 30*a–b* fails to get a success for that, the selected GGSN 30*a–b* may initiate a context deletion by communicating a delete context request.

Note that such an authentication approach closes the potential security hole that is present in other authentication methods. The CHAP challenge may be communicated in a first create response and a CHAP response may be communicated in a second create request, whereas the pair would otherwise be delivered in one single message. Even in scenarios where some entity intercepts both of these messages and is able to extract the (challenge, response) pair, such an entity would not be able to use it to connect to LNS 64 because in the following instance LNS 64 will communicate a different challenge. In order to be properly authenticated, possession of the CHAP secret is critical and is appropriately provided by communication system 10.

Additionally, it should be noted that such a communications approach would make PPP regeneration work with any type of LNS 64 because, for example, the potential need for an AVP (to communicate the challenge) in an ICCN message is eliminated. Additionally, the CHAP rechallenge may work if the PCO addition to the update context request/response is accepted.

Figure 2:
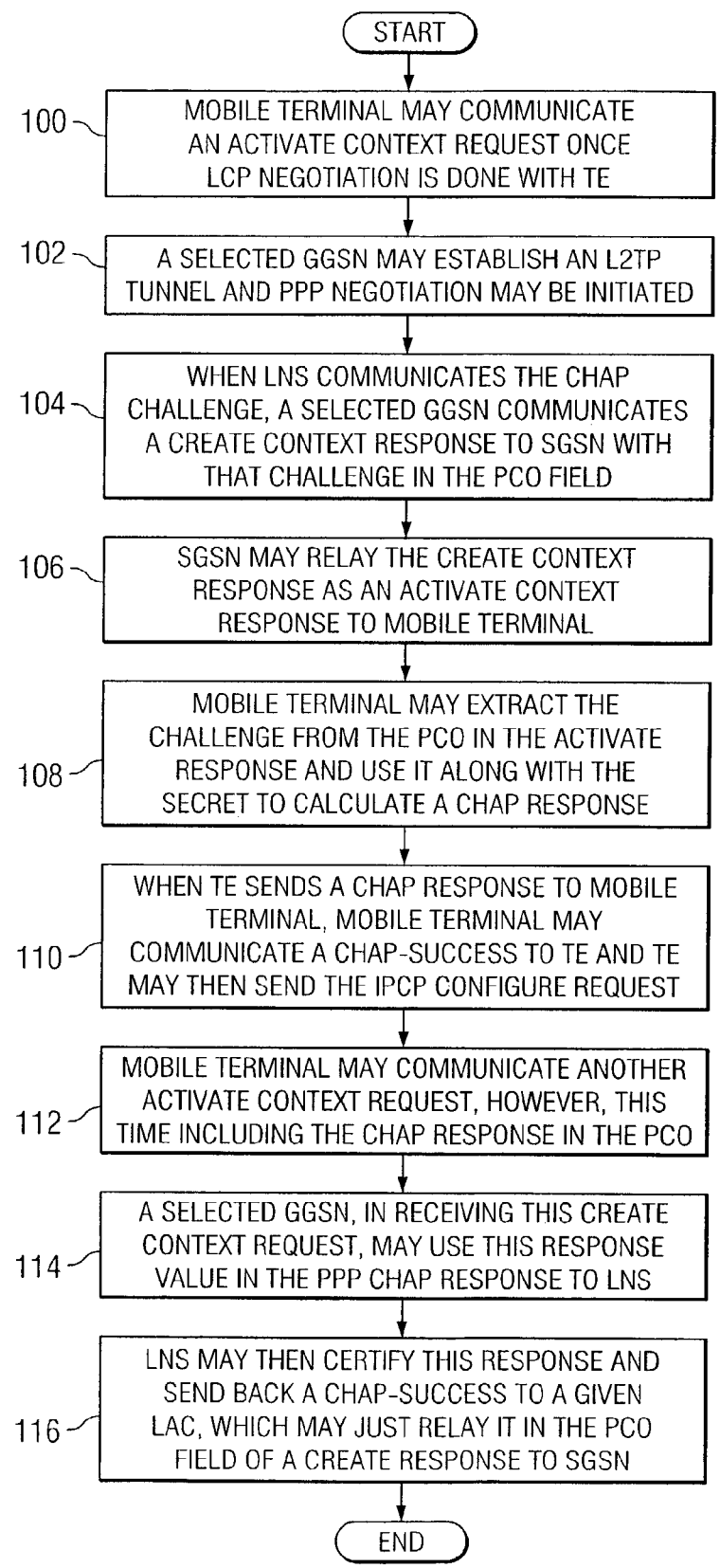
FIG. 2 is a flowchart illustrating a series of example steps associated with a method for executing an end to end authentication in a network environment.

FIG. 2 is a simplified flowchart illustrating a series of example steps associated with a method for providing an end to end authentication in a network environment. The method begins at step 100 where mobile terminal 12 may communicate an activate context request once LCP negotiation is done with TE. The PCO field contains the LCP option (including the authentication protocol). A selected GGSN 30*a–b* may establish an L2TP tunnel and PPP negotiation may be initiated at step 102. When LNS 64 communicates the CHAP challenge, a selected GGSN 30*a–b* communicates a create context response to SGSN 18 with that challenge in the PCO field at step 104. A new cause value may be used (but not necessarily) in the create context response ("CHAP in progress").

SGSN 18 will not create the context because the cause value is not "request accepted." SGSN 18 may relay the create context response as an activate context response to mobile terminal 12 at step 106. Mobile terminal 12 may extract the challenge from the PCO in the activate response and send it as a CHAP challenge to TE at step 108. When TE sends a CHAP response to mobile terminal 12, mobile terminal 12 may send a CHAP-success to TE at step 110 and TE may then send the IPCP configure request. In such a scenario, mobile terminal 12 may generate a CHAP response by using the secret and the challenge. Thus, the authentication response sent by mobile terminal 12 (a CHAP response calculated by mobile terminal 12 using the secret and the challenge) may be communicated as part of the PCO from mobile terminal 12 to GGSN 30a.

At step 112, mobile terminal 12 may send another activate context request, however this time including the CHAP response in the PCO. A selected GGSN 30a–b, in receiving this create context request, may use this response value in the PPP CHAP response to LNS 64 at step 114. At step 116, LNS 64 may then certify this response and send back a CHAP-success to a given LAC 34a–b, which may just relay it in the PCO field of a create response to SGSN 18. Such an operation effectively achieves an end-to-end CHAP procedure in communication system 10.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention.

It is important to recognize that FIG. 2 illustrates just one of a myriad of potential implementations of communication system 10. A CHAP rechallenge may work using a PCO in an update request or response for PPP regeneration with any type of LNS. Additionally, even without PPP regeneration or a corresponding LNS, where an AAA server is coupled to a GGSN, a rechallenge may work using the same mechanism (potentially triggering an update request/response) on receiving a rechallenge from the AAA server.

From a perspective associated with one example embodiment, a procedure associated with communication system 10 may be viewed in two parts. The first part is associated with context activation in a secure manner. This may include contact from mobile terminal 12 to LAC 34a of GGSN 30a. An LCP setup may then occur between GGSN 30a and LNS 64. A CHAP challenge may also be communicated from LNS 64 to GGSN 30a. An activate context response may then be communicated from GGSN 30a to mobile terminal 12. An active request may then be communicated from mobile terminal 12 to GGSN 30a, whereby the PCO field includes a CHAP response. The CHAP response may be communicated to LNS 64, which communicates back a CHAP success. A CHAP success may then be communicated to mobile terminal 12 after execution of a negotiation between LNS 64 and GGSN 30a.

In a second part, a rechallenge mechanism may be provided. LNS (or AAA server 40) may communicate a CHAP rechallenge that is forwarded to GGSN 30a, which communicates an update context request to mobile terminal 12. Mobile terminal 12 may calculate a response using the secret and then communicate an update context response to GGSN 30a. A CHAP response may then be communicated from GGSN 30a to LNS 64, which may then return a CHAP success to GGSN 30a.

Although the present invention has been described in detail with reference to IP communications, communication system 10 may be used for any tunneling protocol involving authentication in a network environment. Any suitable communications that involve an end to end authentication may benefit from the teachings of the present invention. The use of mobile terminal 12 and IP communications have only been offered for purposes of teaching and should not be construed to limit the scope of the present invention in any way.

In addition, communication system 10 may be extended to any scenario in which mobile terminal 12 is provided with an authentication capability (in the context of a wired or a wireless connection or coupling) and communicates with some type of access server (e.g. a network access server (NAS), foreign agents, etc.). Mobile terminal 12 may use a dedicated connection of some form or use forms of multiple access protocols where appropriate. Access may be associated with PPP or alternatively with layer three protocols over an L2 layer in accordance with particular needs. Such an embodiment may include any suitable tunnel terminators and/or tunnel initiators.

Moreover, although communication system 10 has been illustrated with reference to particular authentication protocols, these protocols may be replaced by any suitable authentication processes or mechanisms. For example, communication system 10 may be used with a password authentication protocol (PAP) or an extensible authentication protocol (EAP) . References to CHAP have been for purposes of example and teaching only and, accordingly, should be construed as such.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for executing end to end authentication in a network environment, comprising:
    a mobile terminal operable to initiate a communications tunnel with a layer two tunnel protocol (L2TP) network server (LNS) and to communicate an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal, the mobile terminal being further operable to calculate an authentication response by using a secret value and a challenge value which is provided by the GGSN, the authentication response being used to establish a communication session associated with the mobile terminal.

2. The apparatus of claim 1, wherein the mobile terminal communicates a configure request to a serving GPRS support node (SGSN) in order to establish the communication session, and wherein a point to point protocol (PPP) negotiation is initiated that involves the mobile terminal, a first stage of the PPP negotiation being associated with selecting which authentication protocol is going to be used.

3. The apparatus of claim 2, wherein the GGSN includes an L2TP access concentrator (LAC) operable to facilitate communications between the GGSN and the SGSN.

4. The apparatus of claim 2, wherein the LNS communicates an authentication challenge value that is positioned in the PCO field of a create context response that the GGSN communicates to the SGSN, the create context response being communicated to the mobile terminal in form of the activate context response, and wherein the mobile terminal is operable to extract the challenge value from the PCO field in the activate context request and communicate it to terminal equipment as an authentication challenge message.

5. The apparatus of claim 4, wherein the terminal equipment is operable to communicate the secret value to the mobile terminal.

6. The apparatus of claim 1, wherein a PPP negotiation begins between the GGSN and the LNS in order to establish the communications tunnel, the LNS recognizing the authentication protocol to use based on the PPP negotiation.

7. The apparatus of claim 1, wherein the authentication protocol is a selected one of a group consisting of:
a challenge handshake authentication protocol (CHAP);
a extensible authentication protocol (EAP); and
a password authentication protocol (PAP).

8. An apparatus for executing end to end authentication in a network environment, comprising:
a gateway general packet radio service (GPRS) support node (GGSN) operable to receive an activate context request generated by a mobile terminal, the activate context request including an authentication protocol provided in a protocol configuration option (PCO) field, wherein the mobile terminal is operable to initiate a communications tunnel with a layer two tunnel protocol (L2TP) network server (LNS), the GGSN being operable to initiate a link control protocol (LCP) negotiation with the LNS and to communicate an activate context response that may be received by the mobile terminal, the mobile terminal being further operable to calculate an authentication response by using a secret value and a challenge value which is provided by the GGSN, the authentication response being used to establish a communication session associated with the mobile terminal.

9. The apparatus of claim 8, wherein the mobile terminal communicates a configure request to a serving GPRS support node (SGSN) in order to establish the communication session, and wherein a point to point protocol (PPP) negotiation is initiated that involves the mobile terminal, a first stage of the PPP negotiation being associated with selecting which authentication protocol is going to be used.

10. The apparatus of claim 9, wherein the GGSN includes an L2TP access concentrator (LAC) operable to facilitate communications between the GGSN and the SGSN.

11. The apparatus of claim 9, wherein the LNS communicates an authentication challenge value that is positioned in the PCO field of a create context response that the GGSN communicates to the SGSN, the create context response being communicated to the mobile terminal in form of the activate context response, and wherein the mobile terminal is operable to extract a challenge value from the PCO field in the activate context request and communicate it to terminal equipment as an authentication challenge message.

12. The apparatus of claim 8, wherein a PPP negotiation begins between the GGSN and the LNS in order to establish the communications tunnel, the LNS recognizing the authentication protocol to use based on the PPP negotiation.

13. A method for executing end to end authentication in a network environment, comprising:
initiating a communications tunnel with a layer two tunnel protocol (L2TP) network server (LNS);
communicating an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal; and
calculating an authentication response by using a secret value and a challenge value which is provided by the GGSN, the authentication response being used to establish a communication session associated with the mobile terminal.

14. The method of claim 13, further comprising:
communicating a configure request to a serving GPRS support node (SGSN) in order to establish the communication session.

15. The method of claim 13, further comprising:
initiating a point to point protocol (PPP) negotiation, wherein a first stage of the PPP negotiation is associated with selecting which authentication protocol is to be used.

16. The method of claim 13, further comprising:
receiving an authentication challenge value that is positioned in the PCO field of a create context response that the GGSN communicates, the create context response being communicated in form of the activate context response;
extracting a challenge value from the PCO field in the activate context request; and
communicating the challenge value as an authentication challenge message.

17. A system for executing end to end authentication in a network environment, comprising:
means for initiating a communications tunnel with a layer two tunnel protocol (L2TP) network server (LNS);
means for communicating an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal; and
means for calculating an authentication response by using a secret value and a challenge value which is provided by the GGSN, the authentication response being used to establish a communication session associated with the mobile terminal.

18. The system of claim 17, further comprising:
means for communicating a configure request to a serving GPRS support node (SGSN) in order to establish the communication session.

19. The system of claim 17, further comprising:
means for initiating a point to point protocol (PPP) negotiation, wherein a first stage of the PPP negotiation is associated with selecting which authentication protocol is to be used.

20. The system of claim 17, further comprising:
means for receiving an authentication challenge value that is positioned in the PCO field of a create context response that the GGSN communicates, the create context response being communicated in form of the activate context response;
means for extracting a challenge value from the PCO field in the activate context request; and
means for communicating the challenge value as an authentication challenge message.

21. Software for executing end to end authentication in a network environment, the software being embodied in a computer readable medium and having code such that when executed is operable to:
initiate a communications tunnel with a layer two tunnel protocol (L2TP) network server (LNS);

communicate an activate context request that includes an authentication protocol in a protocol configuration option (PCO) field, the activate context request being received by a gateway general packet radio service (GPRS) support node (GGSN) that initiates a link control protocol (LCP) negotiation with the LNS, the GGSN being operable to communicate an activate context response that may be received by the mobile terminal; and calculate an authentication response by using a secret value and a challenge value which is provided by the GGSN, the authentication response being used to establish a communication session associated with the mobile terminal.

22. The medium of claim 21, wherein the code is further operable to:

communicate a configure request to a serving GPRS support node (SGSN) in order to establish the communication session.

23. The medium of claim 21, wherein the code is further operable to:

initiate a point to point protocol (PPP) negotiation, wherein a first stage of the PPP negotiation is associated with selecting which authentication protocol is to be used.

24. The medium of claim 21, wherein the code is further operable to:

receive an authentication challenge value that is positioned in the PCO field of a create context response that the GGSN communicates, the create context response being communicated in form of the activate context response; and communicate a challenge value as an authentication challenge message.

* * * * *